United States Patent
Gillam et al.

(10) Patent No.: US 11,734,863 B2
(45) Date of Patent: Aug. 22, 2023

(54) COMPUTING AND DISPLAYING ASYMPTOTES AND REMOVABLE DISCONTINUITIES

(71) Applicant: Texas Instruments Incorporated, Dallas, TX (US)

(72) Inventors: Christopher John Gillam, Ponte Vedra Beach, FL (US); Michel Georges Stella, Dallas, TX (US); Malgorzata Anna Brothers, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 445 days.

(21) Appl. No.: 16/290,871

(22) Filed: Mar. 2, 2019

(65) Prior Publication Data

US 2020/0279416 A1    Sep. 3, 2020

(51) Int. Cl.
*G06T 11/20* (2006.01)
*G06F 17/10* (2006.01)
*G06F 15/02* (2006.01)

(52) U.S. Cl.
CPC ............ *G06T 11/203* (2013.01); *G06F 15/02* (2013.01); *G06F 17/10* (2013.01); *G06T 11/20* (2013.01); *G06T 11/206* (2013.01)

(58) Field of Classification Search
CPC ...... G06T 11/20; G06T 11/203; G06T 11/206; G06F 17/10; G06F 15/02
USPC ........................................ 345/440, 619, 418
See application file for complete search history.

(56) References Cited

U.S. PATENT DOCUMENTS

| | | | | |
|---|---|---|---|---|
| 7,432,926 B1 * | 10/2008 | Cherkas | ................ | G06F 17/10 345/440 |
| 7,595,801 B1 * | 9/2009 | Cherkas | ................ | G06T 11/20 345/418 |
| 7,889,199 B1 * | 2/2011 | Cherkas | ................ | G06T 11/20 345/418 |
| 8,499,014 B2 | 7/2013 | Miller et al. | | |
| 8,749,553 B1 * | 6/2014 | Krasovsky | ............ | G06V 10/42 345/440 |

(Continued)

OTHER PUBLICATIONS

Diane M. Yost, "Vertical and Horizontal Asymptotes", at https://www.cgc.edu/Academics/LearningCenter/Math/Documents/Forms/AllItems.aspx, published Jun. 5, 2012 12:36 PM (Year: 2012).*

(Continued)

*Primary Examiner* — Jin Cheng Wang
(74) *Attorney, Agent, or Firm* — Charles F. Koch; Frank D. Cimino

(57) ABSTRACT

A method and a digital device for evaluating a generalized rational function are provided in which the evaluation of the generalized rational function includes computing all discontinuities of the generalized rational function, determining, for each discontinuity, whether or not the discontinuity is a removable discontinuity, wherein the determining includes determining whether or not the generalized random function approaches a point near the discontinuity, and displaying each removable discontinuity. A method for evaluating a generalized rational function on a handheld graphing calculator is provided that includes determining whether or not the generalized rational function has at least one asymptote and displaying the at least one asymptote on a display screen when the generalized rational function has the at least one asymptote.

15 Claims, 11 Drawing Sheets

(56) References Cited

U.S. PATENT DOCUMENTS

| | | | |
|---|---|---|---|
| 2002/0067357 A1* | 6/2002 | Hosea | G06T 11/206 |
| | | | 345/440 |
| 2009/0027393 A1* | 1/2009 | Kelly | G06T 11/203 |
| | | | 345/440 |
| 2017/0011239 A1 | 1/2017 | Chapman et al. | |
| 2019/0096103 A1* | 3/2019 | Tanaka | G06F 17/10 |

OTHER PUBLICATIONS

"TI-Nspire CAS Reference Guide" Texas Instruments Incorporated, pp. 1-271, 2006-2017.
"TI-Nspire handhelds Test preparation: Press-to-Test", Texas Instruments Incorporated, p. 1, 2014.

\* cited by examiner

COMPUTING AND DISPLAYING ASYMPTOTES AND REMOVABLE DISCONTINUITIES

BACKGROUND

Understanding the domain of functions is an important part of a mathematics curriculum. Accordingly, the ability to compute and display asymptotes and removable discontinuities of generalized rational functions is a desirable feature for educational use of handheld devices such as graphing calculators as such functionality allows users to better understand and visualize the domain of such functions.

SUMMARY

Embodiments of the present invention relate to methods and systems for computing and displaying asymptotes and removable discontinuities. In one aspect, a method for evaluating a generalized rational function on a digital device is provided that includes computing, by at least one processor of the digital device, all discontinuities of the generalized rational function, determining, for each discontinuity, whether or not the discontinuity is a removable discontinuity, where the determining comprises determining, by the at least one processor, whether or not the generalized random function approaches a point near the discontinuity, and displaying each removable discontinuity on a display screen by the at least one processor.

In one aspect, a method for evaluating a generalized rational function on a handheld graphing calculator is provided that includes determining, by a processor of the handheld graphing calculator, whether or not the generalized rational function has at least one asymptote, and displaying, by the processor, the at least one asymptote on a display screen when the generalized rational function has the at least one asymptote.

In one aspect, a digital device is provided that includes a memory storing software instructions for evaluating a generalized rational function and at least one processor coupled to the memory to execute the software instructions. The software instructions include software instructions to compute all discontinuities of the generalized rational function, determine, for each discontinuity, whether or not the discontinuity is a removable discontinuity, wherein the determining comprises determining whether or not the generalized random function approaches a point near the discontinuity, and display each removable discontinuity on a display screen by the at least one processor.

DETAILED DESCRIPTION

Figure 1:
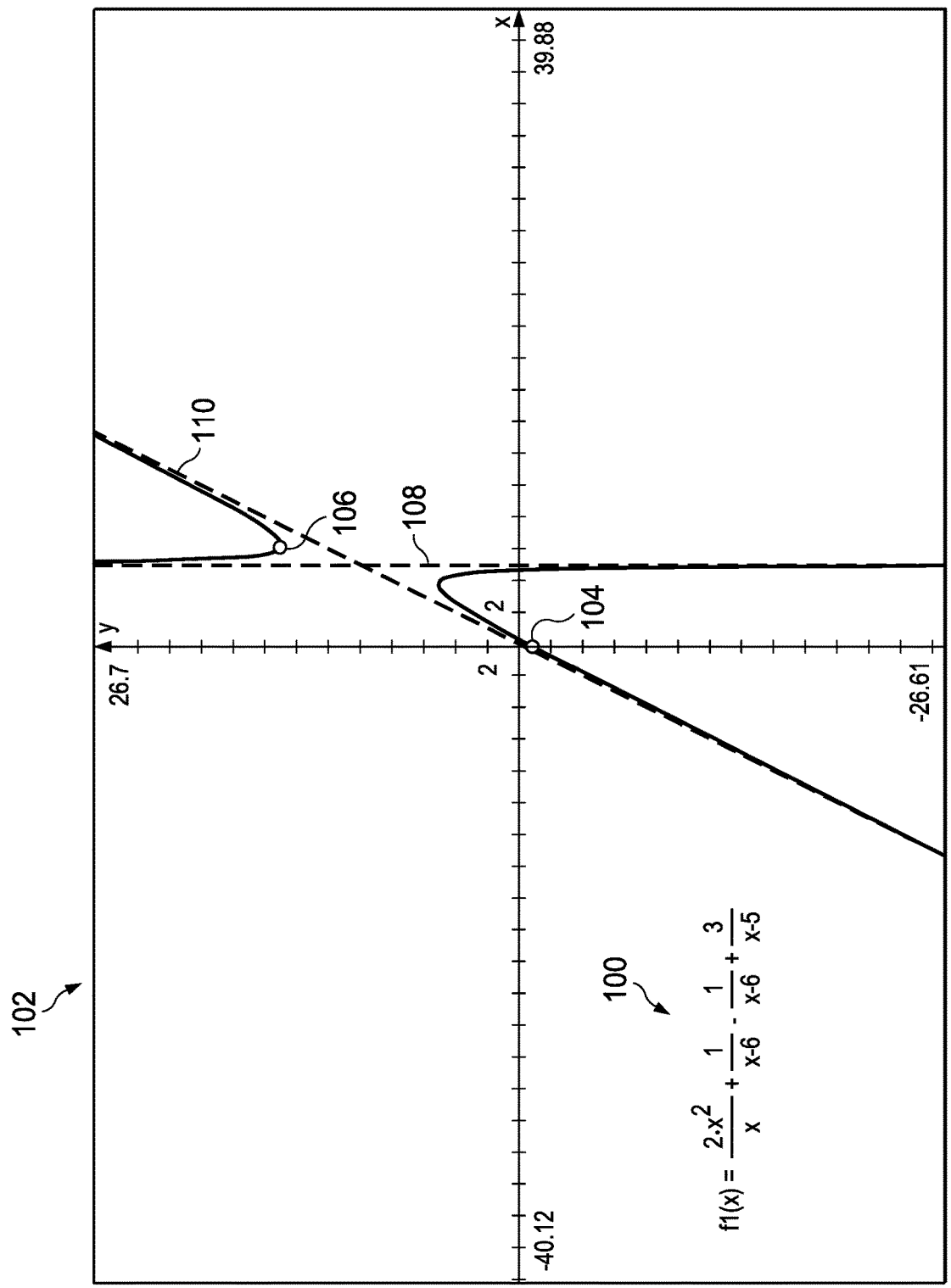
FIG. 1 is an example of a graph of a rational function.

Specific embodiments of the disclosure will now be described in detail with reference to the accompanying figures. Like elements in the various figures are denoted by like reference numerals for consistency.

Embodiments of the disclosure provide for computing and displaying asymptotes and removable discontinuities of generalized rational functions on digital devices such as, for example, handheld graphing calculators, tablets, etc. Having the ability to calculate and graph asymptotes and removable discontinuities can improve understanding of rational function limits and domains, e.g., for students in a classroom, by providing more accurate visual displays. For example, if students are learning about domains of functions, the ability to calculate and graph removable discontinuities and vertical asymptotes on a digital device can improve understanding of types of discontinuities. Further, if students are learning about limits of functions, the ability to calculate and graph asymptotes can improve the understanding of the subject matter. In addition, for all users, the ability to calculate and graphically display removable discontinuities of functions provides a more accurate representation of the functions. Further, the computation of asymptotes and removable discontinuities are as accurate as numerical results and can be exact results in some embodiments.

A generalized rational function can be a rational function or a polynomial raised to a negative integer power. Further, a generalized rational function divided by a polynomial is also a generalized rational function. The sum, difference, and/or product of generalized functions are also generalized rational functions. In addition, a generalized rational function raised to a nonnegative integer power is a generalized rational function. A rational function is a function expressed as a ratio of polynomials, i.e., an algebraic fraction in which both the numerator and denominator are polynomials. For example, the function 100 of FIG. 1, which includes the sum and difference of four rational functions, is a generalized rational function. Further, a generalized rational function can be reduced to a rational function with appropriate domain restrictions. For example, the generalized rational function 100 of FIG. 1 equals the rational function $(2x^2-10x+3)/(x-5)$ except where x=0 and x=6.

The domain of a function f(x) is the set of all values of x for which the function is defined and the range of the function is the set of all values that f(x) takes. For a generalized rational function, the domain is all real numbers except those numbers that result in zeros in the denominator of any division operation in the generalized rational function. Further, the graph of a generalized rational function has a discontinuity at each value excluded from the domain. These discontinuities can be one of two types: removable discontinuities, also referred to as holes, and infinite discontinuities, also referred to as vertical asymptotes. A generalized rational function f(x) has a removable discontinuity at the value a if the discontinuity at a can be removed by changing the value of the function at a to a finite value i.e., making $$f(a) = \lim_{x \to a} f(x)$$

if the limit is finite. If the function becomes infinitely large or infinitely small as x converges to a finite value, e.g., a, from either direction, then a vertical asymptote exists at that finite value of x, i.e., at x=a.

Holes or removable discontinuities are the domain restrictions that are removed when a generalized rational function is reduced to a rational function in its simplest form. The example generalized rational function 100 of FIG. 1 can be reduced to $(2x^2-10x+3)/(x-5)$. The domain restrictions that are removed by this reduction occur at are x=0 and x=6. Therefore, the generalized rational function 100 has a vertical asymptote at x=5 and has two removable discontinuities with x coordinates of 0 and 6. The y coordinates of the removable discontinuities can be calculated by substituting the x coordinate in the reduced function. Thus, the coordinates of the removable discontinuities are (0, −3/5) and (6, 15). The graph 102 illustrates the two removable discontinuities 104, 106 and the vertical asymptote 108 of the generalized rational function 100.

Generalized rational functions may also have other types of asymptotes including horizontal asymptotes and oblique asymptotes. A horizontal asymptote means the output of the generalized rational function approaches a constant value as the value x approaches ∞ or −∞. An oblique asymptote only occurs when the numerator of the reduced rational function from the generalized rational function has a degree that is one higher than the degree of the denominator. For example, the generalized rational function 100 of FIG. 1 meets this criterion and the graph 102 shows the resulting oblique asymptote 110.

Figure 2:
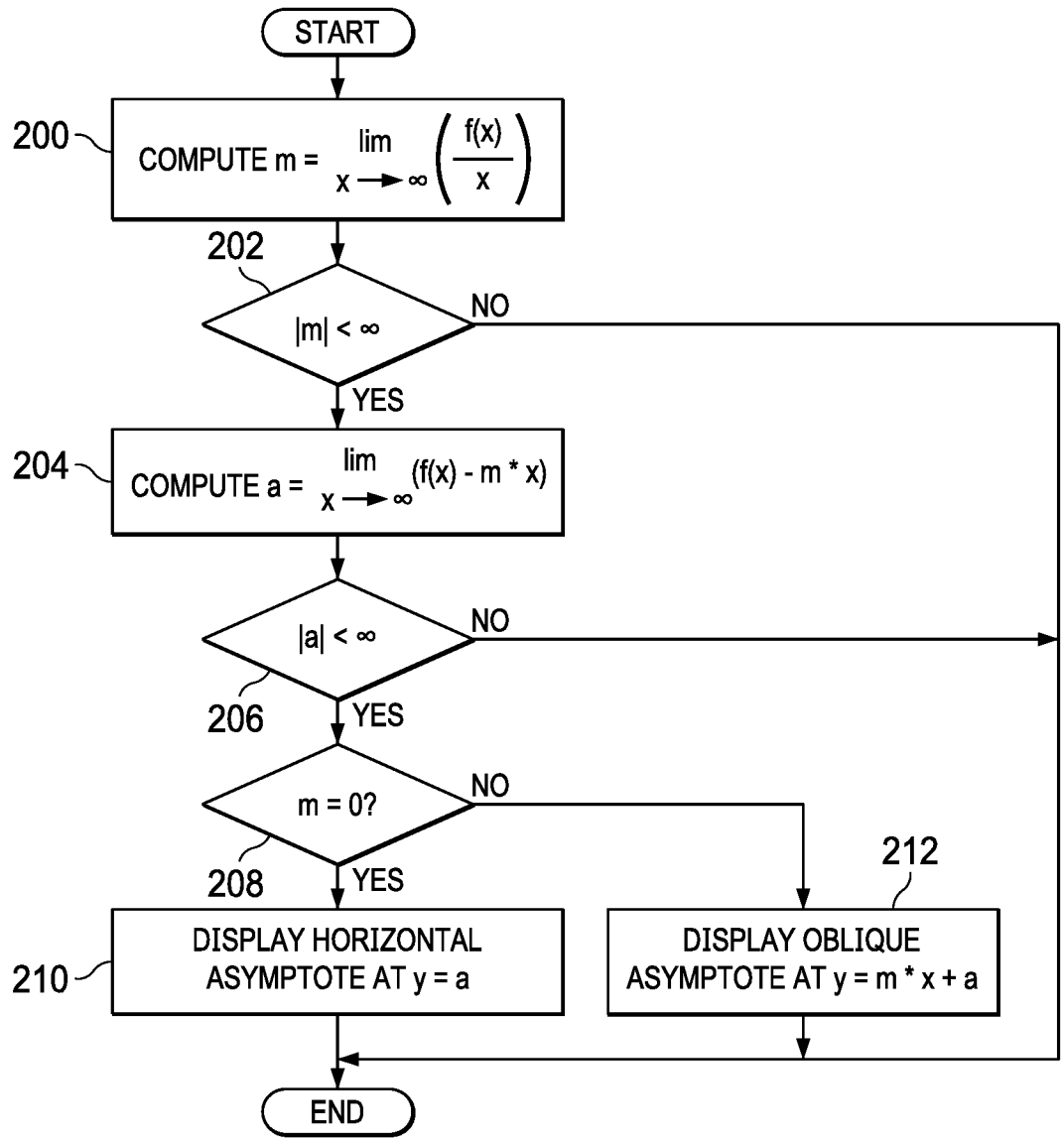
FIG. 2 is a flow diagram of a method for determining horizontal and oblique asymptotes of a function.

FIG. 2 is a flow diagram of a method for determining horizontal and oblique asymptotes of a function f(x), e.g., a generalized rational function, suitable for execution on a digital device. Initially, a determination is made as to whether or not the graph of the function f(x) includes a horizontal or oblique asymptote. In general, the graph of the function f(x) includes such an asymptote if the graph becomes linear as x approaches ∞ or −∞. Accordingly, the slope of the graph as x approaches ∞ or −∞, i.e., $$m = \lim_{x\to\infty}\left(\frac{f(x)}{x}\right),$$

is computed 200 and the magnitude of m is compared to ∞ 202. If m is defined, which is always true of generalized rational functions, and finite, i.e., the magnitude of m is less than ∞ 202, there is either a horizontal asymptote or an oblique asymptote. Otherwise, there is no horizontal or oblique asymptote.

For example, if $f(x)=x^2$, then $$m = \lim_{x\to\infty}\left(\frac{f(x)}{x}\right) = \lim_{x\to\infty}\left(\frac{x^2}{x}\right) = \lim_{x\to\infty}(x) = \infty,$$

the graph does not behave as a line as the value of x grows so the graph has no horizontal or oblique asymptote. However, if $f(x)=(5x^2-1)/(4x)$, then $$m = \lim_{x\to\infty}\left(\frac{f(x)}{x}\right) = \lim_{x\to\infty}\left(\frac{\frac{5x^2-1}{4x}}{x}\right) = \lim_{x\to\infty}\left(\frac{5x^2-1}{4x^2}\right) = \lim_{x\to\infty}\left(\frac{5}{4}-\frac{1}{4x^2}\right) = \frac{5}{4}.$$

In this case, the graph behaves like a line as x grows, and more specifically, the graph behaves like a line with slope 5/4.

If the function has a horizontal or oblique asymptote 202, then the y-intercept of the line is computed 204 as per $$a = \lim_{x\to\infty}(f(x) - m\cdot x).$$

If the y-intercept is finite, i.e., the magnitude of a is less than ∞ 206, there is either a horizontal or oblique asymptote. Otherwise, there is no asymptote. Note that for a generalized rational function, the magnitude of the y-intercept is always less than infinity. Accordingly, the step of checking the value of the y-intercept a is optional and can be excluded if the function f(x) is a generalized rational function.

Given the y-intercept a and the slope m, the asymptote of the function f(x) can be defined as per y=m*x+a. If m=0 208, i.e., the slope of the line is 0, then there is a horizontal asymptote at y=a and the horizontal asymptote is displayed 210 on the display screen of the digital device. Otherwise, there is an oblique asymptote defined by y=m*x+a and the oblique asymptote is displayed 212 on the display screen of the digital device. Continuing the previous example, given $f(x)=(5x^2-1)/(4x)$ and m=5/4, $$a = \lim_{x\to\infty}(f(x) - m\cdot x) =$$
$$\lim_{x\to\infty}\left(\frac{5x^2-1}{4x} - \frac{5}{4}x\right) = \lim_{x\to\infty}\left(\frac{5x^2-1-5x^2}{4x}\right) = \lim_{x\to\infty}\left(-\frac{1}{4x}\right) = 0.$$

Thus, the equation of the oblique asymptote of f(x) is y=5/4*x+0=5/4*x.

As is explained in more detail herein, the horizontal or oblique asymptote can be displayed, for example, as part of the graph of the function f(x) or by textual display. In some embodiments, when only the horizontal asymptote is to be determined, the method begins at step 204 with m=0 as the slope of a horizontal asymptote is always zero.

Figure 3:
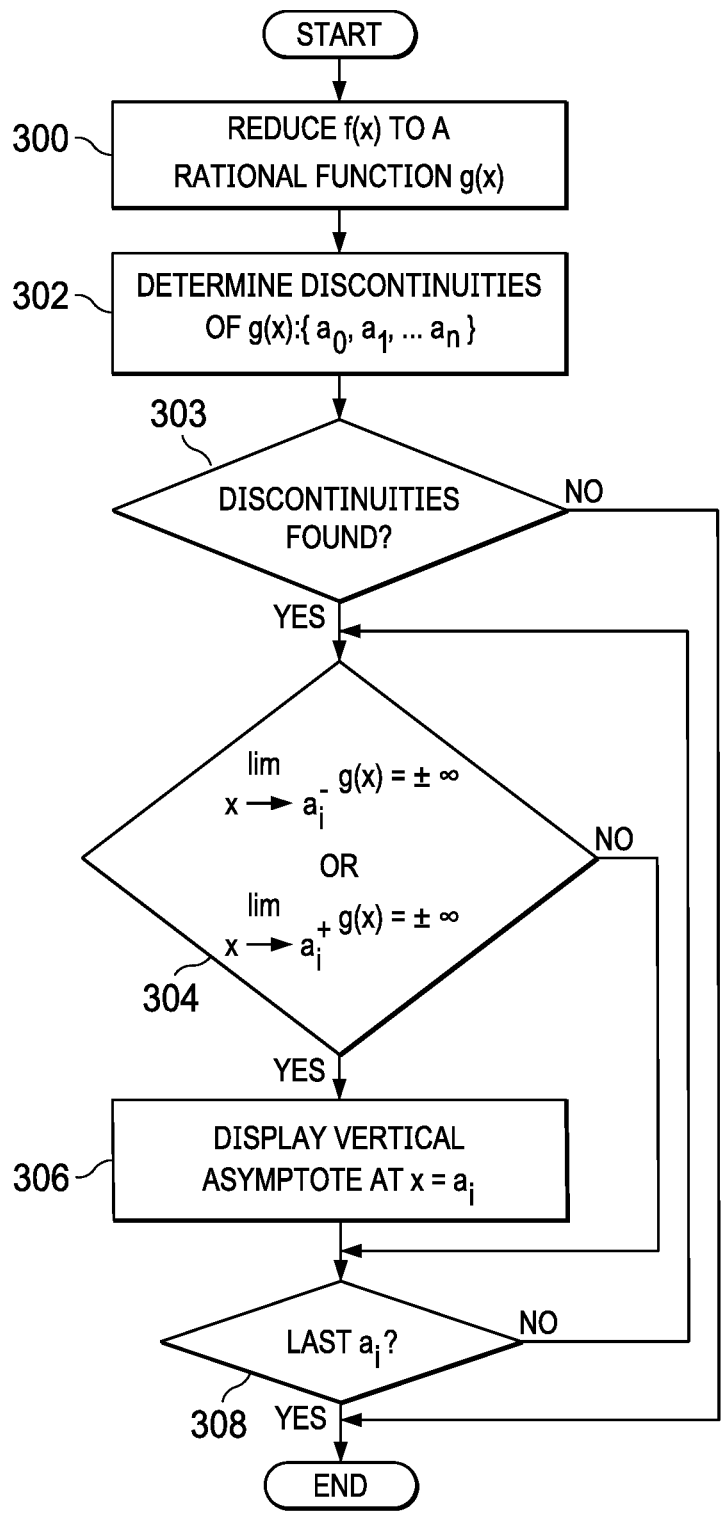
FIG. 3 is a flow diagram of a method for determining the vertical asymptotes of a generalized rational function.
Figure 5:
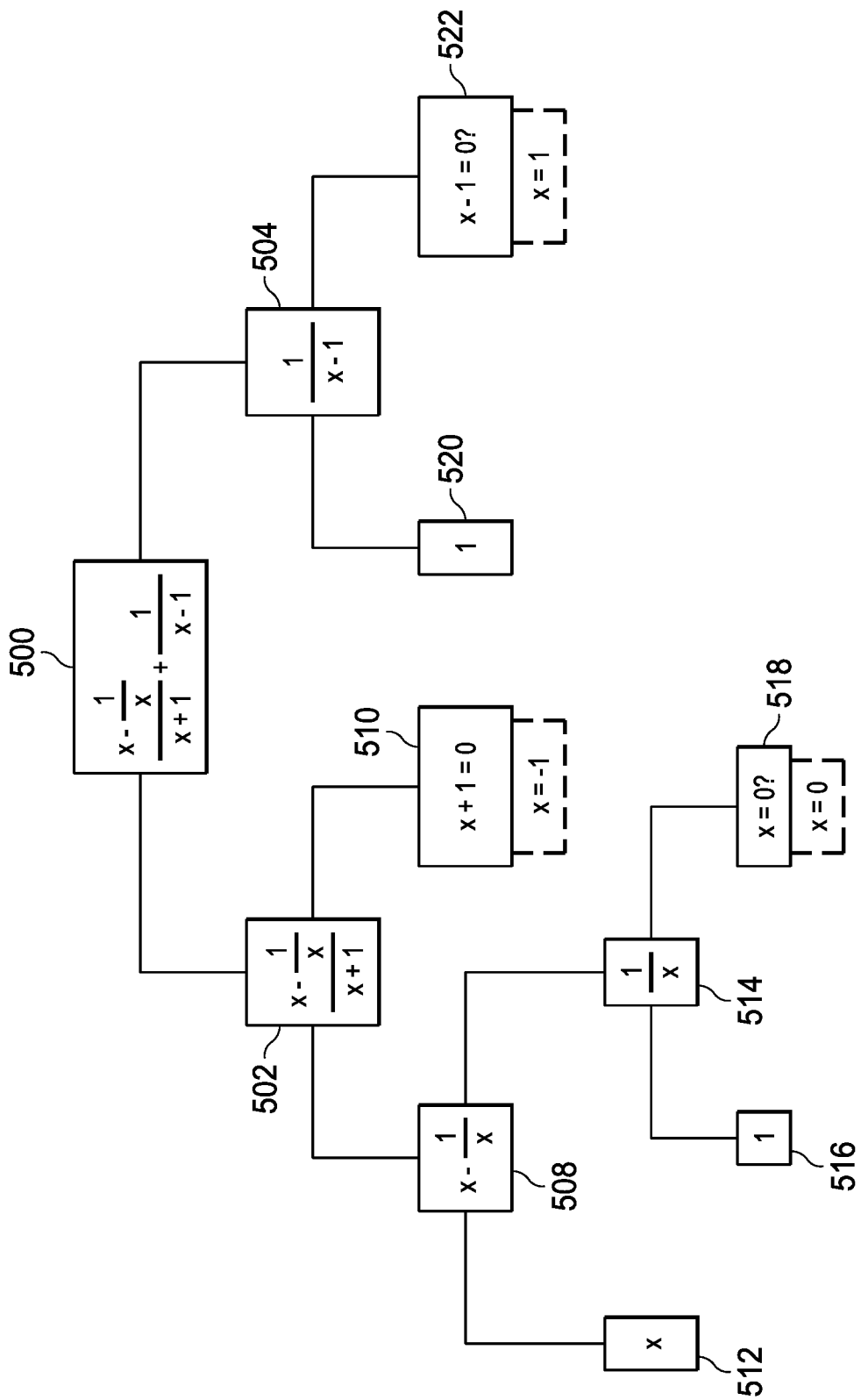
FIG. 5 is an example illustrating determining discontinuities of a generalized rational function.

FIG. 3 is a flow diagram of a method for determining the vertical asymptotes of a generalized rational function f(x) suitable for execution on a digital device. Initially, the generalized rational function f(x) is reduced to a simplified rational function to hide any removable discontinuities 300, i.e., all factors common to both the numerator and denominator are cancelled out and all terms are combined. This step is performed to simplify the calculations performed in subsequent steps to enhance performance and can be eliminated in other embodiments. The discontinuities of the resulting generalized rational function g(x) are then determined 302. For example, if $$f(x) = \frac{1}{x} - \frac{x-1}{x-1},$$

then $$g(x) = \frac{1-x}{x}$$

and there is a discontinuity at x=0. Any suitable technique for determining the discontinuities can be used. In some embodiments, the method for determining the discontinuities as described herein in reference to Table 1 and FIG. 5 is used.

If no discontinuities are found 303, the generalized rational function f(x) has no vertical asymptotes. If one or more discontinuities are found 303, then each discontinuity as is checked 304-308 to determine if it is a vertical asymptote. There is a vertical asymptote at a discontinuity as if the graph of g(x) approaches ∞ or −∞ as the value of x approaches as from any direction. More specifically, the limit of g(x) as the value of x approaches the discontinuity $a_i$ from the left direction, i.e., $$\lim_{x \to a_i^-} g(x),$$

is calculated. If the limit is equal to ±∞, then there is a vertical asymptote. Otherwise, the limit of g(x) as the value of x approaches the discontinuity a from the right direction, i.e., $$\lim_{x \to a_i^+} g(x),$$

is calculated and compared to ±∞. If either value is equal to +∞ 304, then there is a vertical asymptote at x=$a_i$ which is displayed 306 on the display screen of the digital device. Otherwise, there is no vertical asymptote at the discontinuity $a_i$. As is explained in more detail herein, the vertical asymptote(s) can be displayed, for example, as part of the graph of the function f(x) or by textual display. Continuing the previous example, for $$g(x) = \frac{1-x}{x}, \lim_{x \to 0^-} g(x) = -\infty \text{ and } \lim_{x \to 0^+} g(x) = \infty,$$

so there is a vertical asymptote at x=$a_0$, where $a_0$=0.

Figure 4:
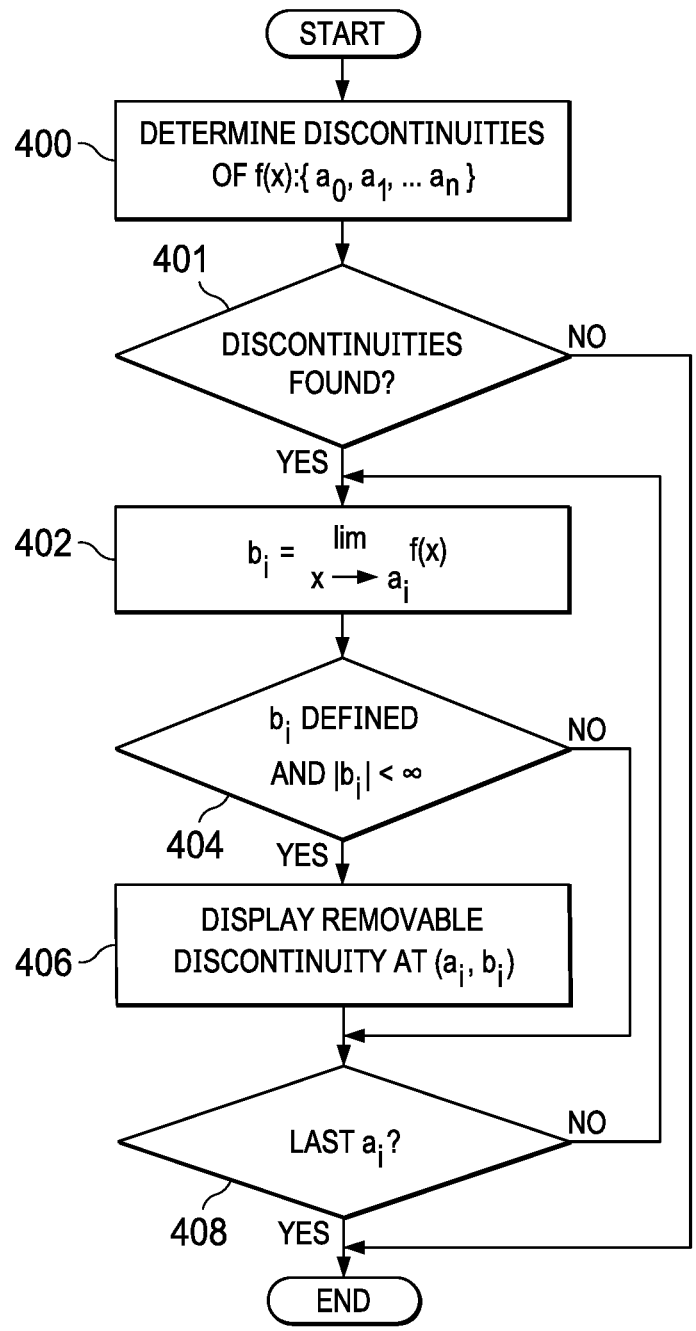
FIG. 4 is a flow diagram of a method for determining the removable discontinuities of a generalized rational function.

FIG. 4 is a flow diagram of a method for determining the removable discontinuities of a generalized rational function f(x) suitable for execution on a digital device. Initially, the discontinuities of the generalized rational function f(x) are determined 400. Any suitable technique for determining the discontinuities can be used. In some embodiments, the method for determining the discontinuities as described herein in reference to Table 1 and FIG. 5 is used. If no discontinuities are found 401, the generalized rational function f(x) has no removable discontinuities. If one or more discontinuities are found 401, then each discontinuity a is checked 402-408 to determine if it is a removable discontinuity.

Unlike asymptotes, removable discontinuities are points and as such, have an x-coordinate and a y-coordinate. If a function has a removable discontinuity, the function can be made continuous at the x-coordinate location of the removable discontinuity by setting the function to the corresponding y-coordinate, i.e., by filling the hole with a point. Accordingly, to determine if a discontinuity as is a removable discontinuity, the behavior of the function, i.e., the y-coordinate values, as the function approaches the discontinuity as from both directions are examined. To determine the behavior, $$b_i = \lim_{x \to a_i} f(x)$$

is computed 402. If $b_i$ is defined, i.e., the behavior of the function is known and the same from the left and right, and is finite, i.e., the magnitude of $b_i$ is less than ∞ 404, then $b_i$ is a single finite value which indicates that the function approaches a point at the discontinuity a and the removable discontinuity at ($a_i$, $b_i$) is displayed 406. Otherwise, the discontinuity a is not a removable discontinuity. As is explained in more detail herein, the removable discontinuities can be displayed, for example, as part of the graph of the function f(x) or by displaying the coordinates of the removable discontinuities textually.

Consider the following three examples. If f(x)=($x^2$−1)/x, there is a discontinuity at x=0 and the function behaves differently as the discontinuity is approached from the two different directions:

$$\lim_{x \to a_0^-} f(x) =$$

$$\lim_{x \to 0^-} \frac{x^2 - 1}{x} = \lim_{x \to 0^-} \left(x - \frac{1}{x}\right) = \lim_{x \to 0^-} x - \lim_{x \to 0^-} \frac{1}{x} = 0 - (-\infty) = \infty$$

$$\lim_{x \to a_0^+} f(x) = \lim_{x \to 0^+} \frac{x^2 - 1}{x} = \lim_{x \to 0^+} \left(x - \frac{1}{x}\right) = \lim_{x \to 0^+} x - \lim_{x \to 0^+} \frac{1}{x} = 0 - \infty = -\infty$$

As a result, $b_i$ is not defined (step 404) and the discontinuity is not removable.

If f(x)=($x^3$−1)/$x^2$, there is a discontinuity at x=0 and the function behaves the same as the discontinuity is approached from the two different directions:

$$\lim_{x \to a_0^-} f(x) =$$

$$\lim_{x \to 0^-} \frac{x^3 - 1}{x^2} = \lim_{x \to 0^-} \left(x - \frac{1}{x^2}\right) = \lim_{x \to 0^-} x - \lim_{x \to 0^-} \frac{1}{x^2} = 0 - \infty = -\infty$$

$$\lim_{x \to a_0^+} f(x) = \lim_{x \to 0^+} \frac{x^3 - 1}{x^2} = \lim_{x \to 0^+} \left(x - \frac{1}{x^2}\right) = \lim_{x \to 0^+} x - \lim_{x \to 0^+} \frac{1}{x^2} = 0 - \infty = -\infty$$

As a result, $b_0$ is defined, i.e.

$$b_0 = \lim_{x \to a_0} f(x) = \lim_{x \to 0} \frac{x^3 - 1}{x^2} = -\infty.$$

However, $b_0$ is not finite which means the function cannot be made continuous by replacing the discontinuity with a point. Accordingly, the discontinuity is not removable.

If f(x)=($x^2$−x)/x, there is a discontinuity at x=0 the function behaves the same as the discontinuity is approached from the two different directions:

$$\lim_{x \to a_0^-} f(x) = \lim_{x \to 0^-} \frac{x^2 - x}{x} = \lim_{x \to 0^-} (x - 1) = -1$$

$$\lim_{x \to a_0^+} f(x) = \lim_{x \to 0^+} \frac{x^2 - x}{x} = \lim_{x \to 0^+} (x - 1) = -1$$

As a result, $b_0$ is defined, i.e.:

$$b_0 = \lim_{x \to a_0} f(x) = \lim_{x \to 0} \frac{x^2 - x}{x} = -1.$$

Furthermore, $b_0$ is finite which means that the function can be made locally continuous by replacing the discontinuity with a point. Thus, there is a removable discontinuity at (0,−1).

Table 1 is pseudo code of a method for determining all discontinuities in a generalized rational function f(x). In general, the pseudo code walks the function and recursively examines the domain to locate the discontinuities, i.e., the values of x that cause the denominators in the generalized rational function to become zero. More specifically, the pseudo code parses a generalized rational function from left to right, recursing on each operand of the top level operators negation, plus, minus, and multiplication identified in a recursion iteration. When the top level operator is division, the method recurses on the numerator of the division operation and determines the zeros, also referred to as roots, of the denominator. A zero is an input value that produces an output of zero. A zero or root of a denominator is a discontinuity of the input generalized rational function.

If the top level operation in a recursion iteration is exponentiation and the exponent is positive, the method recurses on the base. If the top level operation is exponentiation and the exponent is negative, the zeros of the base are determined. A zero in the base of such an exponentiation operation is a discontinuity of the input generalized rational function. If the input to a recursion iteration is a constant or a variable, i.e., there is no top level operation, the input is continuous and the result of the iteration is no discontinuities. The output of the pseudo code is a list of the identified discontinuities referred to as list_of_discontinuities.

TABLE 1 calculate_discontinuities (generalized rational function)
{if (generalized rational function is constant or a variable)
    {// The generalized rational function is a constant, such as 2 or sqrt(3) or pi, or just x and has no discontinuities.
        list_of_discontinuities = { };}
    else if (top level operator is negation sign)
        {// The generalized rational function is the negative of a function.
        Calculate the discontinuities of the function being negated
            list_of_discontinuities = calculate_discontinuities (operand);}
    else if (top level operator is addition, subtraction, or multiplication)
        {// The generalized rational function is sum, difference, and/or product of two generalized rational functions.
        // Calculate the discontinuities of left operand and right operand.
            list_of_discontinuities_1 = calculate_discontinuities (left operand);
            list_of_discontinuities_2 = calculate_discontinuities (right operand);
            list_of_discontinuities = union of list_of_discontinuites_1 and list_of_discontinuities_2 }
    else if (top level operator is division)
        {// The generalized rational function is the quotient of two functions
        If (denominator is a polynomial)
        { list_of_discontinuities_1 = calculate_discontinuities (numerator);
            list_of_discontinuities_2 = zeros of denominator;
            list_of_discontinuities = union of list_of_discontinuites_1 and list_of_discontinuites_2; }
        else
            {//The input is not a generalized rational function
                Throw an error;}}
    else if (top level operator is exponentiation)

TABLE 1-continued

{// The generalized rational function is base$^{power}$
If (power is integer)
{if (power is negative)
    {if (base is polynomial)
        {// For example, the generalized rational function may be (x + 1)$^{-2}$
            list_of_discontinuities = zeros of base;}
        else
        {// The input is not a generalized rational function
            Throw an error; } }
    else
        {// For example, the rational function may be (1/(x−1))$^3$
            list_of_discontinuities = calculate_discontinuities (base);}}
    else
    {// The input is not a generalized rational function
        Throw an error; } }
else
{// The input is not a generalized rational function
    Throw an error; }
return list_of_discontinuities;}

FIG. 5 is an example recursion tree illustrating the operation of the pseudo code of Table 1. The root node 500 of the recursion tree shows the input to the pseudo code which is the generalized rational function $$\frac{x - \frac{1}{x}}{x+1} + \frac{1}{x-1}.$$

In the first recursion iteration, the top level operator is addition. The pseudo code recurses on the left operand $$\frac{x - \frac{1}{x}}{x+1}$$

and the right operand $$\frac{1}{x-1}$$

of the addition, as indicated by the respective child nodes 502, 504. The recursive processing continues at the left child node 502 where the top level operator is division. The pseudo code recurses on the numerator $$x - \frac{1}{x}$$

and determines the zeros of the denominator x+1, as indicated by the respective child nodes 508, 510.

The recursive processing continues at the left child node 508 where the top level operator is subtraction. The pseudo code recurses on the left operand x and the right operand $$\frac{1}{x}$$

of the subtraction, as indicated by the respective child nodes 512, 514. The recursive processing continues at the left child node 512, which is the variable x. The variable x is continuous, so there is no discontinuity. The recursive processing then backtracks to the node 508 and moves to the right child node 514. At the right child node 514, the top level operation is division. The pseudo code recurses on the numerator 1 and determines the zeros of the denominator x, as indicated by the respective child nodes 516, 518.

The recursive processing continues at the left child node 516, which is the constant 1. The constant 1 is continuous, so there is no discontinuity. The recursive processing then backtracks to the node 514 and moves to the right child node 518 to determine the zeros of the denominator x. The denominator is simply the variable x, so the single zero of the denominator is 0, which will be added to the final list of discontinuities output by the pseudo code as the recursive processing unwinds. The recursive processing then backtracks to the node 514, then to the node 508, and ultimately to the node 502. From the node 502, the recursive processing moves to the right child node 510 to determine the zeros of the denominator x+1. The single zero of the denominator is −1, which will be added to the final list of discontinuities output by the pseudo code as the recursive processing unwinds. At this point, two discontinuities have been identified, x=0 and x=−1.

The recursive processing then backtracks to the node 502 and ultimately to the node 500. From the node 500, the recursive processing moves to the right child node 504. At the right child node 504, the top level operator is division. The pseudo code recurses on the numerator 1 and determines the zeros of the denominator x−1, as indicated by the respective child nodes 520, 522. The recursive processing continues at the left child node 520, which is the constant 1. The constant 1 is continuous, so there is no discontinuity. The recursive processing then backtracks to the node 504 and moves to the right child node 522 to determine the zeros of the denominator x−1. The single zero of the denominator is 1, which will be added to the final list of discontinuities output by the pseudo code as the recursive processing unwinds. At this point, three discontinuities have been identified, x=0, x=−1, and x=1. The recursive processing backtracks to the node 504 and ultimately to the node 500, where processing terminates and the list of discontinuities {0, −1, 1} is returned.

Figure 6:
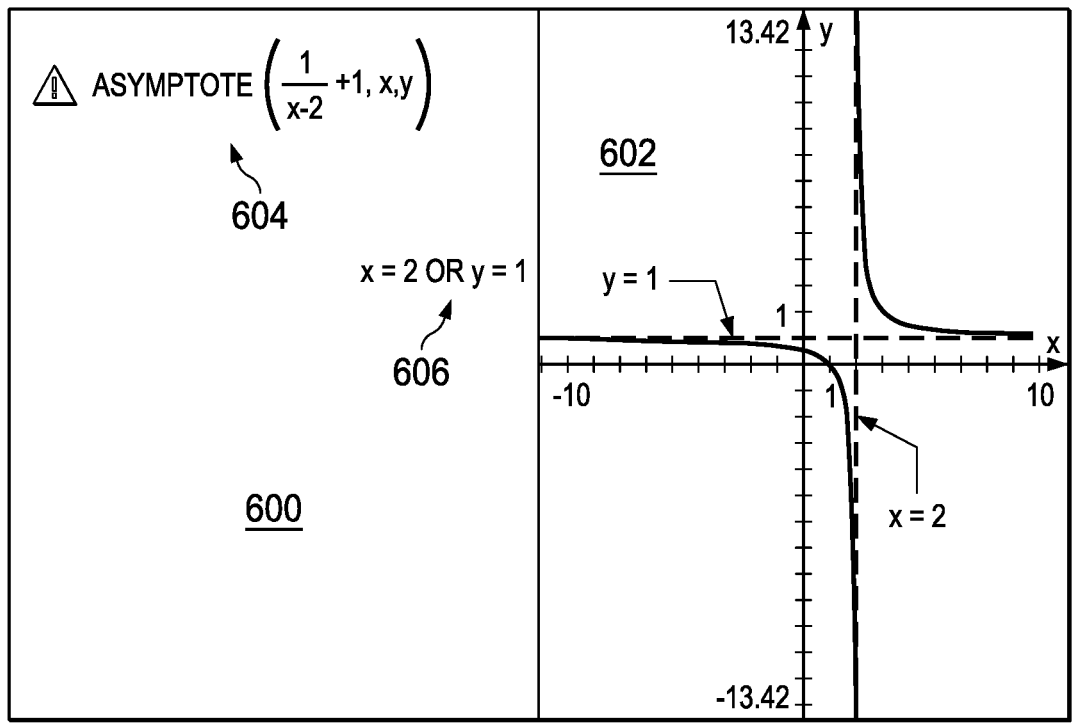
FIGS. 6-14 are examples of user interfaces.

FIGS. 6-14 are examples of various interfaces to the above described methods. Each example shows two example interfaces, a graphical interface on the right and a textual interface on the left, as such interfaces might appear on the display screen of a digital device, e.g., a handheld graphing calculator. The example of FIG. 6 illustrates determining all the asymptotes of a function. In the textual interface 600, the user enters 604 the name of the command, in this case "asymptote", and the function. The command asymptote causes implementations of the above methods of FIG. 2 and FIG. 3 for determining horizontal, vertical, and oblique asymptotes to be executed to determine the asymptotes of the function. The result 606 of the command, which in this example is a vertical asymptote at x=2 and a horizontal asymptote at y=1, is displayed textually.

An alternative way of finding all the asymptotes of a function is to display the graph of the function on the display screen and allow the user to select an option for showing all asymptotes from a menu activated by clicking on the graph. The selection of the option causes implementations of the above methods of FIG. 2 and FIG. 3 for determining horizontal, vertical, and oblique asymptotes to be executed to determine the asymptotes of the graphed function and displays the results graphically. The graphical interface 602 shows the results of selecting such an option for the graph of the same function illustrated in the textual interface 600.

Figure 7:
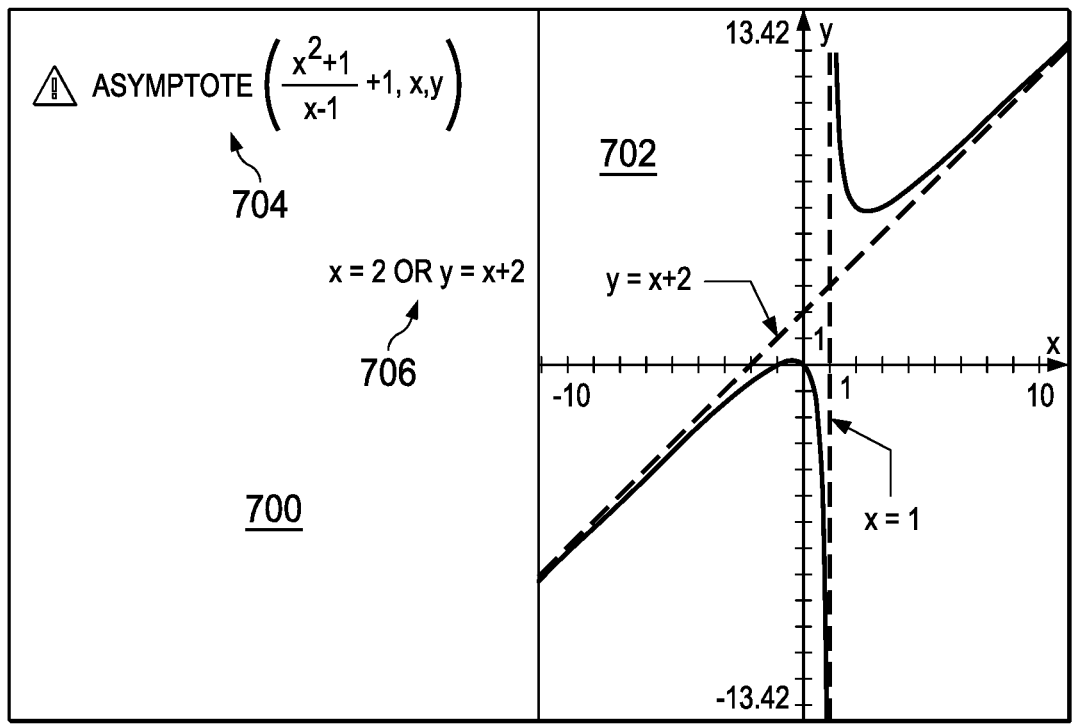

FIG. 7 is another example of determining all asymptotes of a function. In the textual interface 700, the user enters 704 the name of the command and the function. The command asymptote causes implementations of the above methods of FIG. 2 and FIG. 3 for determining horizontal, vertical, and oblique asymptotes to be executed to determine the asymptotes of the function. The result 706 of the command, which in this example is a vertical asymptote at x=1 and an oblique asymptote at y=x+2, is displayed textually. The graphical interface 702 shows the results of selecting an option to show all asymptotes from a menu activated from the graph of the same function illustrated in the textual interface 700.

Figure 8:
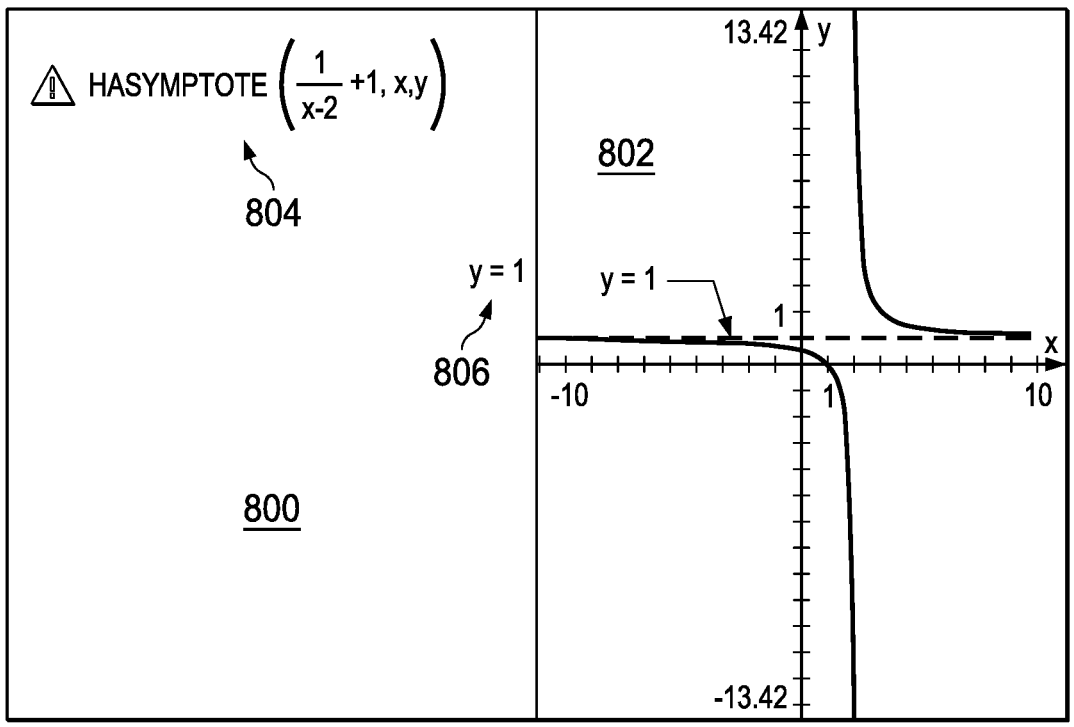

The example of FIG. 8 illustrates determining the horizontal asymptote of a function. In the textual interface 800, the user enters 804 the name of the command, in this case "hasymptote", and the function. The command hasymptote causes an implementation of the above method of FIG. 2 for determining oblique and horizontal asymptotes to be executed to determine the horizontal asymptote of the function. As previously noted, if only the horizontal asymptote is sought, the method can begin at step 204 with m=0. The result 806 of the command, which in this example is a horizontal asymptote at y=1, is displayed textually.

An alternative way of finding the horizontal asymptote of a function is to display the graph of the function on the display screen and allow the user to select an option for showing the horizontal asymptote from a menu activated by clicking on the graph. The selection of the option causes an implementation of the above method of FIG. 2 for determining horizontal and oblique asymptotes to be executed to determine the horizontal asymptote of the graphed function and displays the results graphically. The graphical interface 802 shows the results of selecting such an option for the graph of the same function illustrated in the textual interface 800.

Figure 9:
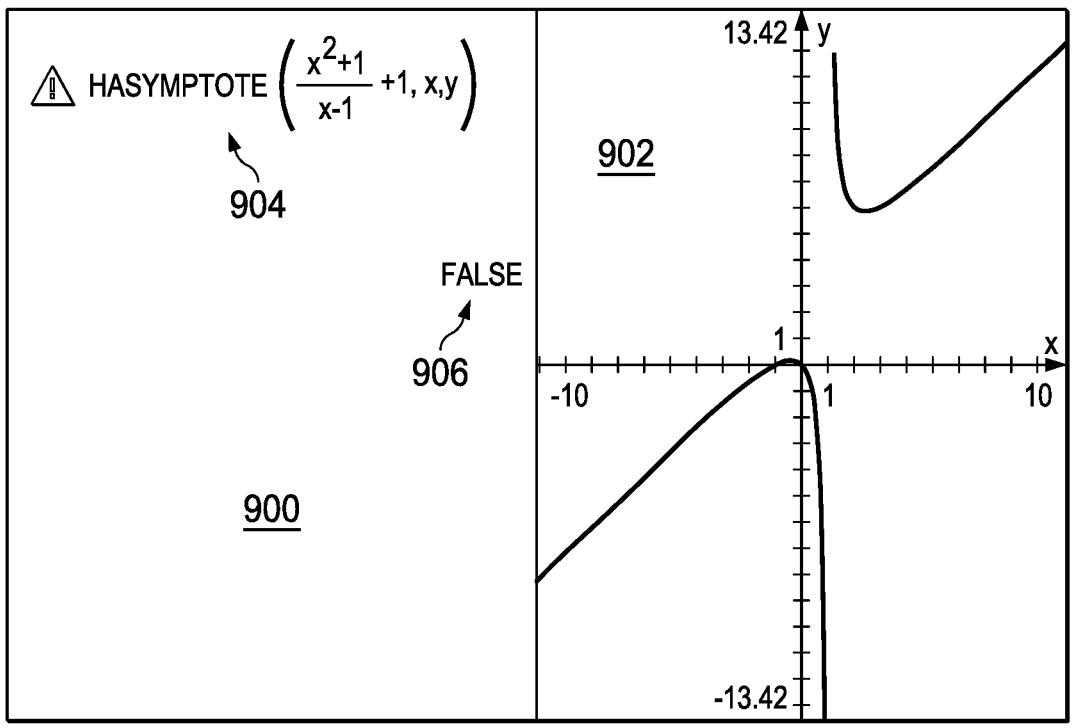

FIG. 9 is another example of determining the horizontal asymptote of a function. In the textual interface 900, the user enters 904 the name of the command and the function. The command "hasymptote" causes an implementation of the above method of FIG. 2 for determining horizontal and oblique asymptotes to be executed to determine the horizontal asymptote of the function. The result 906 of the command, which is false, is displayed textually. The graphical interface 902 shows the results of selecting an option to show the horizontal asymptote from a menu activated from the graph of the same function illustrated in the textual interface 900.

Figure 10:
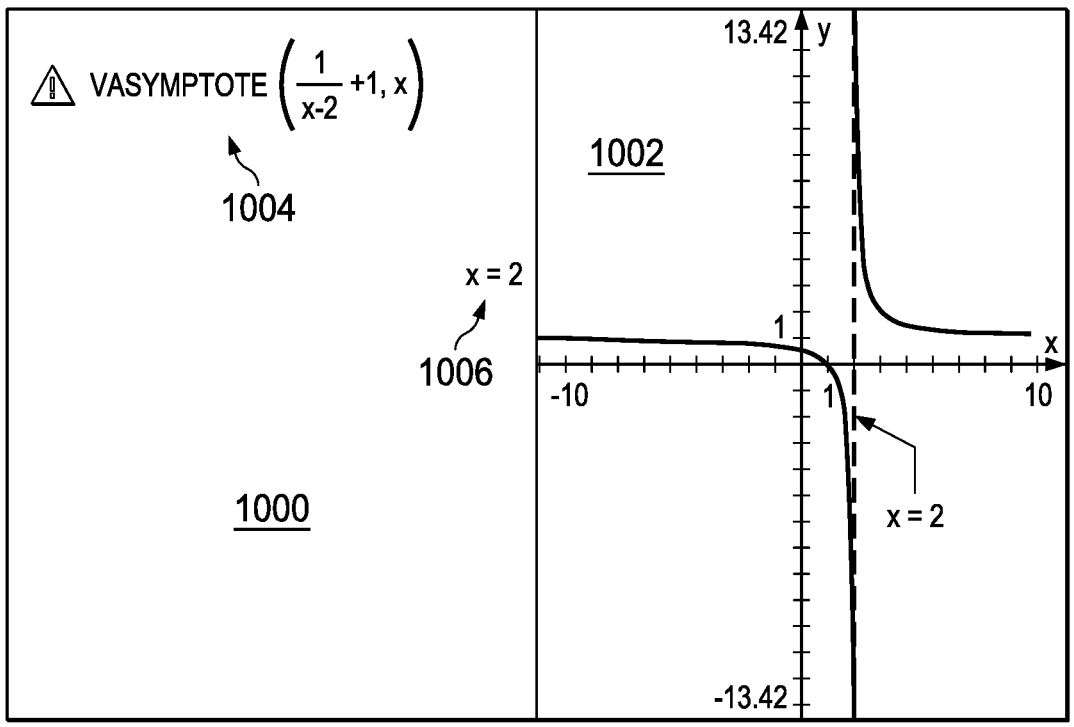

The example of FIG. 10 illustrates determining the vertical asymptotes of a function. In the textual interface 1000, the user enters 1004 the name of the command, in this case "vasymptote", and the function. The command vasymptote causes an implementation of the above method of FIG. 3 for determining vertical asymptotes to be executed to determine the vertical asymptotes of the function. The result 1006 of the command, which in this example is a vertical asymptote at x=2, is displayed textually.

An alternative way of finding the vertical asymptotes of a function is to display the graph of the function on the display screen and allow the user to select an option for showing the vertical asymptotes from a menu activated by clicking on the graph. The selection of the option causes an implementation of the above method of FIG. 3 for determining vertical asymptotes to be executed to determine the vertical asymptotes of the graphed function and displays the results graphically. The graphical interface 1002 shows the results of selecting such an option for the graph of the same function illustrated in the textual interface 1000.

Figure 11:
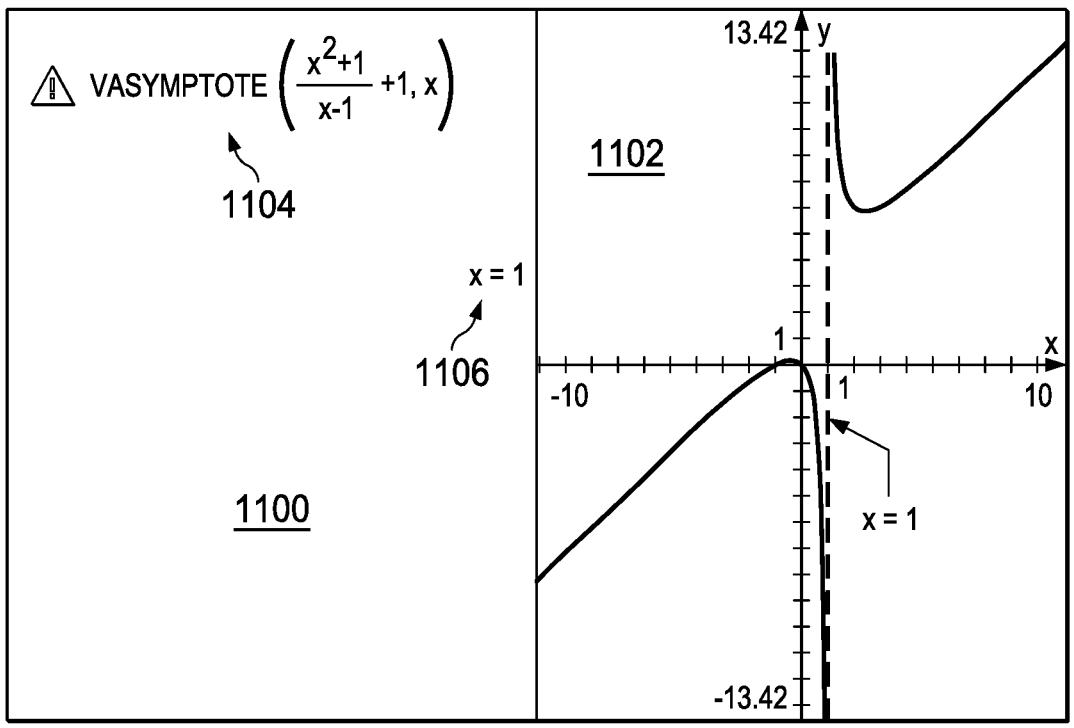

FIG. 11 is another example of determining the vertical asymptotes of a function. In the textual interface 1100, the user enters 1104 the name of the command and the function. The command "vasymptote" causes an implementation of the above method of FIG. 3 for determining vertical asymptotes to be executed to determine the vertical asymptotes of the function. The result 1106 of the command, which is a vertical asymptote at x=1, is displayed textually. The graphical interface 1102 shows the results of selecting an option to show the vertical asymptotes from a menu activated from the graph of the same function illustrated in the textual interface 1100.

Figure 12:
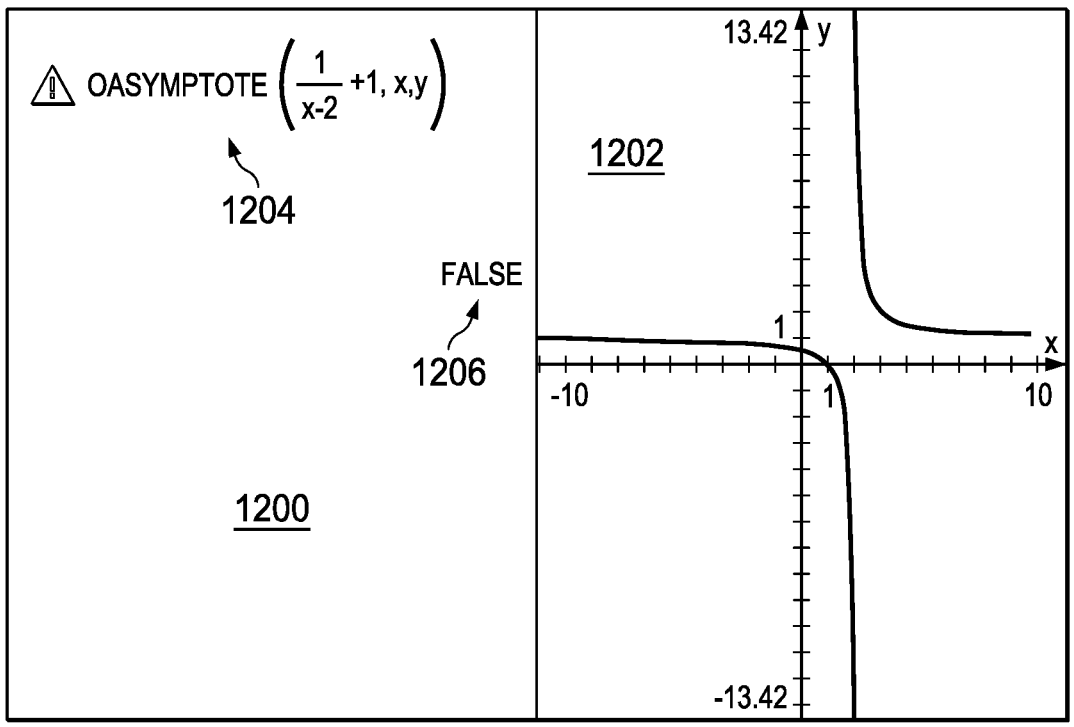

The example of FIG. 12 illustrates determining the oblique asymptote of a function. In the textual interface 1200, the user enters 1204 the name of the command, in this case "oasymptote", and the function. The command oasymptote causes an implementation of the above method of FIG. 2 for determining horizontal and oblique asymptotes to be executed to determine the oblique asymptote of the function. The result 1206 of the command, which in this example is false, is displayed textually.

An alternative way of finding the oblique asymptote of a function is to display the graph of the function on the display screen and allow the user to select an option for showing the oblique asymptote from a menu activated by clicking on the graph. The selection of the option causes an implementation of the above method of FIG. 2 for determining horizontal and oblique asymptotes to be executed to determine the oblique asymptote of the graphed function and displays the results graphically. The graphical interface 1202 shows the results of selecting such an option for the graph of the same function illustrated in the textual interface 1200.

Figure 13:
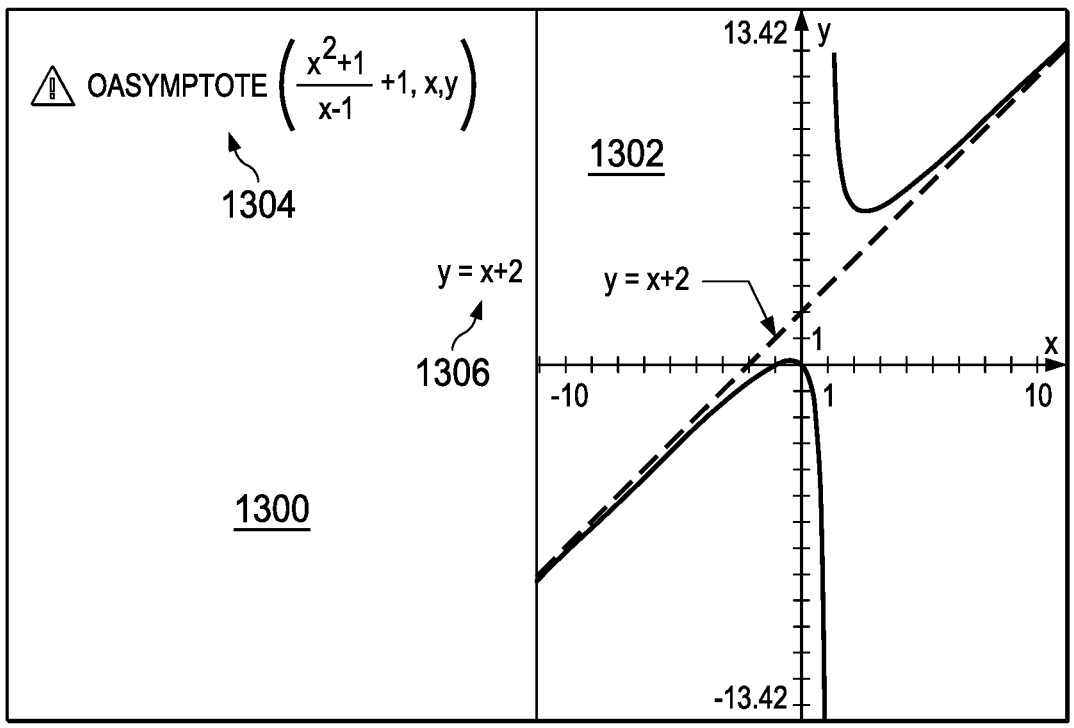

FIG. 13 is another example of determining the oblique asymptote of a function. In the textual interface 1300, the user enters 1304 the name of the command and the function. The command "oasymptote" causes an implementation of the above method of FIG. 2 for determining horizontal and oblique asymptotes to be executed to determine the oblique asymptote of the function. The result 1306 of the command, which is an oblique asymptote at y=x+2, is displayed textually. The graphical interface 1302 shows the results of selecting an option to show the oblique asymptote from a menu activated from the graph of the same function illustrated in the textual interface 1300.

Figure 14:
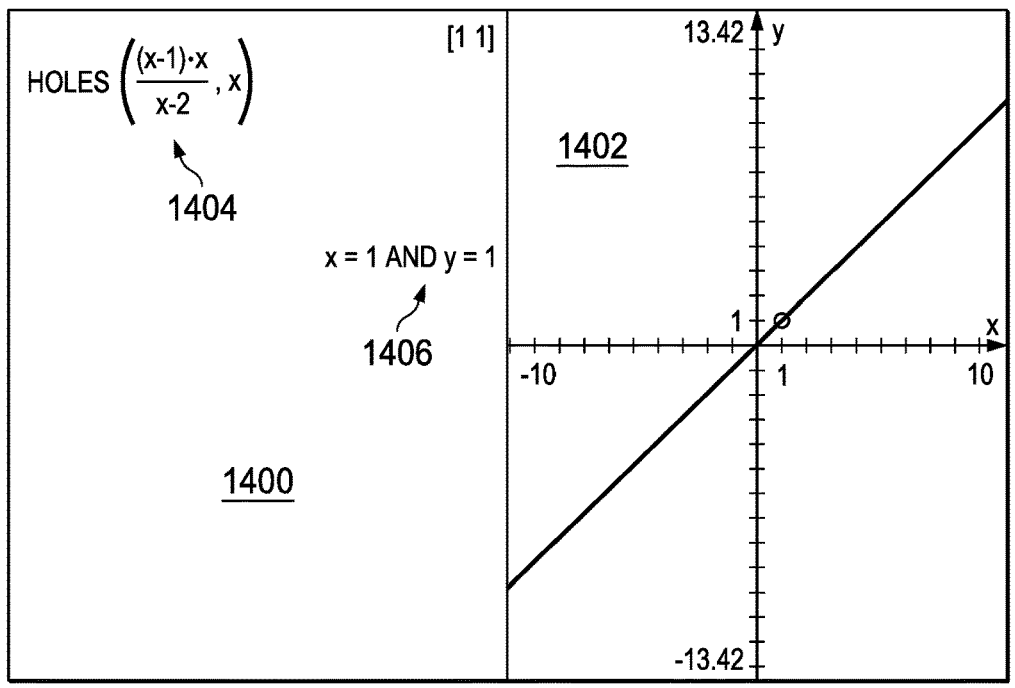

The example of FIG. 14 illustrates determining the holes (removable discontinuities) of a function. In the textual interface 1400, the user enters 1404 the name of the command, in this case "holes", and the function. The command holes causes an implementation of the above method of FIG. 4 for determining removable discontinuities to be executed to determine the removable discontinuities of the function. The result 1406 of the command, which in this example is that there is a removable discontinuity at x=1 and y=1, is displayed textually.

An alternative way of finding the removable discontinuities of a function is to display the graph of the function on the display screen and allow the user to select an option for showing the removable discontinuities from a menu activated by clicking on the graph. The selection of the option causes an implementation of the above method of FIG. 4 for determining removable discontinuities to be executed to determine the removable discontinuities of the graphed function and displays the results graphically. The graphical interface 1402 shows the results of selecting such an option for the graph of the same function illustrated in the textual interface 1400.

Figure 16:
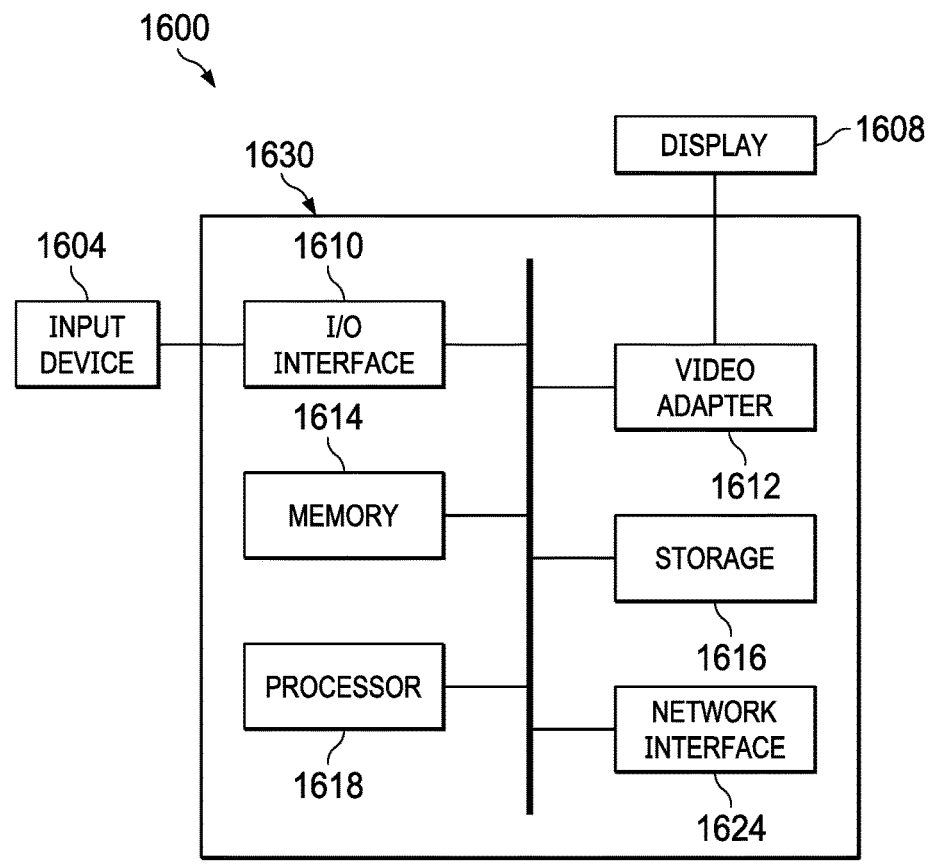
FIGS. 15 and 16 are block diagrams of two example digital devices.
Figure 15:
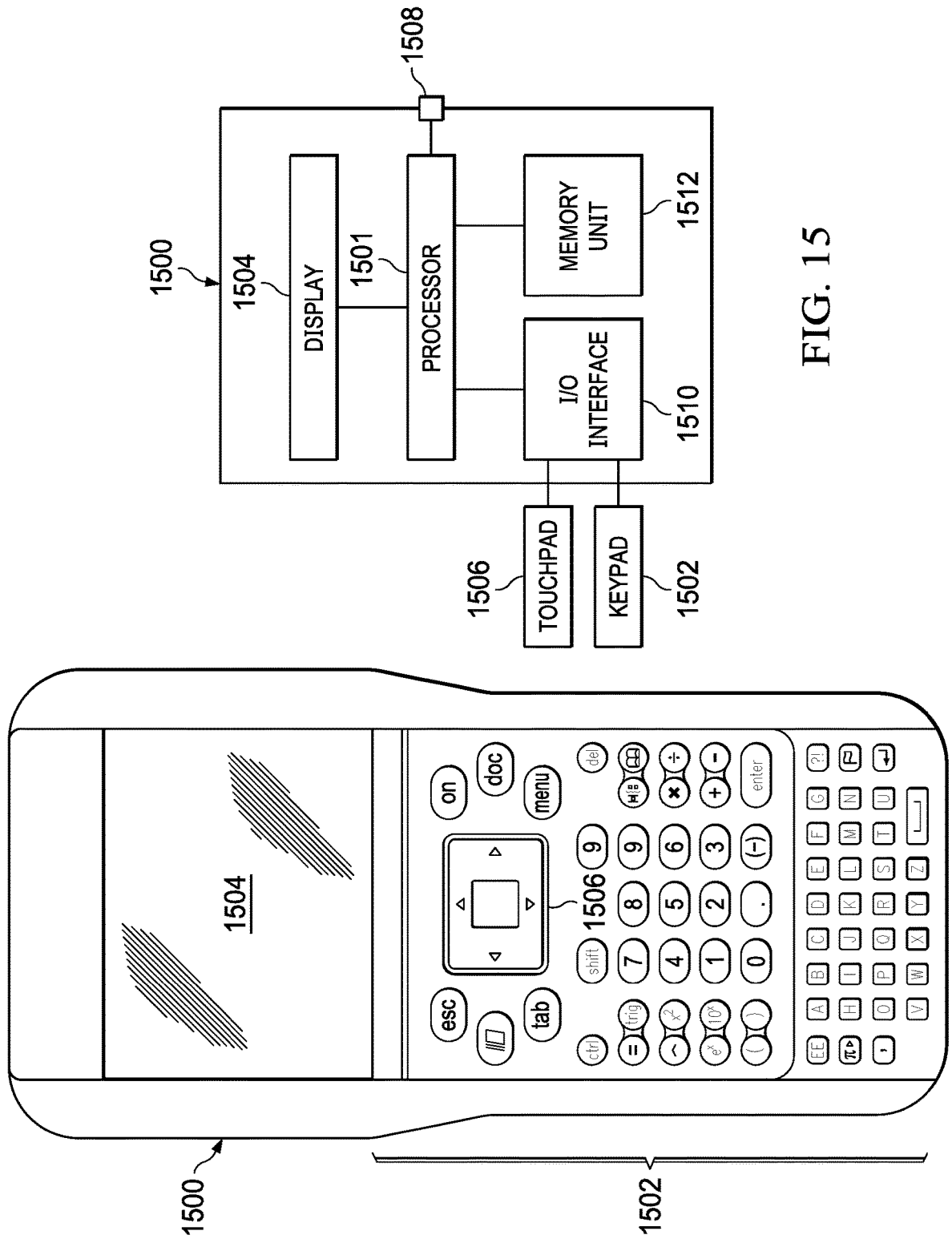

Embodiments of the methods described herein can be implemented on any suitably configured digital device, e.g., a handheld graphing calculator, a smart phone, a tablet, a laptop, or a computer system. FIGS. 15 and 16 are diagrams of two example digital devices.

FIG. 15 is an example of a handheld graphing calculator 1500 configured to perform methods for determining asymptotes and removable discontinuities as described herein described herein. The handheld calculator 1500 includes a display screen 1504, and a keypad 1502 that includes a touchpad 1506. The display screen 1504 can be used to display, among other things, information input to applications executing on the handheld graphing calculator 1500 and various outputs of the applications. For example, the display screen 1504 may be used to display input of commands that activate the use of the methods described herein and the outputs of those commands, and/or the graphs of functions and the results of selecting options from menus that activate the use of the methods and the outputs of the selected options. The display screen 1504 may be, for example, an LCD display.

The keypad 1502 allows a user to enter data and functions and to start and interact with applications executing on the handheld graphing calculator 1500. The keypad 1502 also includes an alphabetic keyboard for entering text. The touchpad 1506 allows a user to interact with the display 1504 by translating the motion and position of the user's fingers on the touchpad 1506 to provide functionality similar to using an external pointing device, e.g., a mouse. A user may use the touchpad 1506 to perform operations similar to using a pointing device on a computer system, e.g., scrolling the display 1504 content, pointer positioning, selecting, highlighting, etc.

The handheld graphing calculator 1500 includes a processor 1501 coupled to a memory unit 1512, e.g., a non-transitory computer-readable medium, which may include one or both of memory for program storage, e.g., read-only memory (ROM), and memory for non-persistent data and program storage, e.g., random-access memory (RAM). In some embodiments, the program storage memory stores software programs and the memory for non-persistent data stores intermediate data and operating results. An input/output port 1508 provides connectivity to external devices, e.g., a wireless adaptor or wireless cradle. In one or more embodiments, the input/output port 1508 is a bi-directional connection such as a mini-A USB port. Also included in the handheld graphing calculator 1500 is an I/O interface 1510. The I/O interface 1510 provides an interface to couple input devices such as the touchpad 1506 and the keypad 1502 to the processor 1501. In some embodiments, the handheld calculator 1500 may also include an integrated wireless interface (not shown) or a port for connecting an external wireless interface (not shown).

In one or more embodiments, the memory unit 1512 stores software instructions to be executed by the processor 1501 to perform embodiments of the methods described herein. Further, in some such embodiments, the memory unit 1512 stores software instructions of a computer algebra system (CAS) that includes functionality to process equations and functions symbolically and functionality for graphing equations and functions. The CAS includes functionality to, for example, simplify rational functions, factor polynomials, compute limits of functions, compute zeros of functions, etc. One example of such a CAS is the CAS installed on the TI-Nspire™ series of graphing calculators available from Texas Instruments, Inc. The CAS is described in "TI-Nspire™ CAS Reference Guide," Texas Instruments, Inc., 2006-2012, which is incorporated by reference herein in its entirety.

FIG. 16 is an example of a computer system 1600 configured to perform methods for determining asymptotes and removable discontinuities as described herein. The computer system 1600 includes a processing unit 1630 coupled to one or more input devices 1604 (e.g., a mouse, a keyboard, or the like), and one or more output devices, such as a display screen 1608. In some embodiments, the display screen 1608 may be touch screen, thus allowing the display screen 1608 to also function as an input device. The processing unit 1630 may be, for example, a desktop computer, a workstation, a laptop computer, a tablet, a dedicated unit customized for a particular application, or the like. The display screen 1608 may be any suitable visual display unit such as, for example, a computer monitor, an LED, LCD, or plasma display, a television, a high definition television, or a combination thereof. The display screen 1608 can be used, for example, to display input of commands that activate the use of the methods described herein and the outputs of those commands, and/or the graphs of functions and the results of selecting options from menus that activate the use of the methods and the outputs of the selected options The processing unit 1630 includes a processor 1618, memory 1614, a storage device 1616, a video adapter 1612, and an I/O interface 1610 connected by a bus. The bus may be one or more of any type of several bus architectures including a memory bus or memory controller, a peripheral bus, video bus, or the like. The processor 1618 may be any type of electronic data processor. For example, the processor 1618 may be a processor from Intel Corp., a processor from Advanced Micro Devices, Inc., a Reduced Instruction Set Computer (RISC), an Application-Specific Integrated Circuit (ASIC), or the like. The memory 1614, e.g., a non-transitory computer-readable medium, can be any type of system memory such as static random access memory (SRAM), dynamic random access memory (DRAM), synchronous DRAM (SDRAM), read-only memory (ROM), a combination thereof, or the like. Further, the memory 1614 can include ROM for use at boot-up, and DRAM for data storage for use while executing programs.

The storage device 1616, e.g., a non-transitory computer-readable medium, can include any type of storage device configured to store data, programs, and other information and to make the data, programs, and other information accessible via the bus. In one or more embodiments, the storage device 1616 stores software instructions to be executed by the processor 1618 to perform embodiments of the methods described herein. The storage device 1616 may be, for example, one or more of a hard disk drive, a magnetic disk drive, an optical disk drive, or the like.

The video adapter 1612 and the I/O interface 1610 provide interfaces to couple external input and output devices to the processing unit 1630. The processing unit 1630 also includes a network interface 1624. The network interface 1624 allows the processing unit 1630 to communicate with remote units via a network (not shown). The network interface 1624 may provide an interface for a wired link, such as an Ethernet cable or the like, or a wireless link. The computer system 1600 may also include other components not specifically shown. For example, the computer system 1600 may include power supplies, cables, a motherboard, removable storage media, cases, and the like.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which a user enters a command to cause removable discontinuities for a generalized rational function to be computed and displayed. In some embodiments, any removable discontinuities of a generalized rational function are displayed by default. That is, when a user requests that generalized rational function be graphed, the removable discontinuities of the function are computed and displayed on the graph of the function automatically. Further, in some such embodiments, the automatic computation and display of removable discontinuities can be disabled and reenabled, e.g., when a student is using the digital device for an examination. Some examples of enabling and disabling functionality on a digital device that can be used are described in U.S. Pat. No. 8,499,014 and United States Patent Application Publication 2017/0011239, both of which are incorporated by reference herein. An example of an interface for selective enabling and disabling of functionality on the TI-Nspire™ series of graphing calculators for testing purposes is described in "TI-Nspire™ handhelds: Test preparation: Press-to-Test", Texas Instruments, Inc., 2014. In addition, in embodiments having a CAS, the computation and display of removable discontinuities can be disabled/enabled by enabling and disabling the CAS.

In another example, embodiments have been described herein in which a user enters commands to cause asymptotes for a generalized rational function to be computed and displayed, either all asymptotes or selected types of asymptotes, e.g., vertical, horizontal, or oblique. In some embodiments, all asymptotes of a generalized rational function are displayed by default. That is, when a user requests that generalized rational function be graphed, the vertical, horizontal, and oblique asymptotes of the function are computed and displayed on the graph of the function automatically. Further, in some such embodiments, the automatic computation and display of asymptotes can be disabled and reenabled, e.g., when a student is using the digital device for an examination. Some examples of enabling and disabling functionality on a digital device that could be used are previously described herein.

In another example, embodiments are described herein in which a user enters textual commands to cause the computation and display of asymptotes and removable discontinuities. In some embodiments, the commands can be selected from menus, e.g., popup or drop down menus.

Software instructions implementing all or portions of methods described herein may be initially stored in a non-transitory computer-readable medium and loaded and executed by one or more processors. In some cases, the software instructions may be distributed via removable non-transitory computer-readable media, via a transmission path from non-transitory computer-readable media on another digital system, etc. Examples of non-transitory computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the disclosure.

What is claimed is:

1. A method for evaluating a generalized rational function on a digital device, the method comprising:
   in response to a graphing request and an examination environment setting received by at least one processor of the digital device indicating a non-examination environment:
      computing, by a computer algebra system running on the at least one processor of the digital device, all discontinuities of the generalized rational function, wherein the computing comprises using a discontinuity determination process to determine the discontinuities, the discontinuity determination process comprising:
         determining that there is no discontinuity in an input to the discontinuity determination process when the input is a constant or a variable;
         determining a top level operator of the input when the input is not a constant or a variable;
         when the top level operator is negation, recursively applying the discontinuity determination process to an operand of the negation;
         when the top level operator is addition, multiplication, or subtraction, recursively applying the discontinuity determination process to a left operand of the top level operator, and recursively applying the discontinuity determination process to a right operand of the top level operator; and
         when the top level operator is division, recursively applying the discontinuity determination process to a numerator of the top level operator, and determining zeroes of a denominator of the top level operator;
         wherein the generalized rational function is an initial input to the discontinuity determination process;
      determining, for each discontinuity determined by the discontinuity determination process, whether or not the discontinuity is a removable discontinuity; and
      displaying each removable discontinuity on a display screen by the at least one processor; and
   in response to the graphing request and the examination environment setting indicating an examination environment, disabling by the at least one processor of the digital device, the computer algebra system.

2. The method of claim 1, wherein displaying further comprises displaying coordinates of each removable discontinuity.

3. The method of claim 1, wherein displaying further comprises displaying each removable discontinuity on a graph of the generalized rational function.

4. The method of claim 1, wherein the digital device is a handheld graphing calculator.

5. The method of claim 1, wherein the discontinuity determination process further comprises:
   when the top level operator is exponentiation and an exponent is a positive integer, recursively applying the discontinuity determination process to a base of the exponentiation; and
   when the top level operator is exponentiation, the exponent is a negative integer, and the base is a polynomial, determining zeroes of the base.

6. The method of claim 1, further compromising:
   determining that a discontinuity computed by the discontinuity determination process is a vertical asymptote; and
   displaying the vertical asymptote on the display screen.

7. A method for evaluating a generalized rational function on a handheld graphing calculator, the method comprising:
   in response to a graphing request and an examination environment setting received by a processor of the handheld graphing calculator indicating a non-examination environment:
      determining, by a computer algebra system running on the processor of the handheld graphing calculator, whether or not the generalized rational function has at least one asymptote, wherein the determining includes:
         reducing, by the processor, the generalized rational function to a simplified rational function;
         computing, by the processor, all discontinuities of the simplified rational function, wherein the computing comprises using a discontinuity determination process to determine the discontinuities, the discontinuity determination process comprising:
            determining that there is no discontinuity in an input to the process when the input is a constant or a variable;
            determining a top level operator of the input when the input is not a constant or a variable;
            when the top level operator is negation, recursively applying the discontinuity determination process to an operand of the negation;
            when the top level operator is addition, multiplication, or subtraction, recursively applying the discontinuity determination process to a left operand of the top level operator, and recursively applying the discontinuity determination process to a right operand of the top level operator; and
            when the top level operator is division, recursively applying the discontinuity determination process to a numerator of the top level operator, and determining zeroes of a denominator of the top level operator;
            wherein the simplified rational function is an initial input to the discontinuity determination process; and
         determining, for each discontinuity computed by the discontinuity determination process, whether or not the discontinuity is a vertical asymptote; and
      displaying, by the processor, the at least one asymptote on a display screen when the generalized rational function has the at least one asymptote, the displaying includes a textual representation of the at least one asymptote; and
   in response to the graphing request and the examination environment setting indicating an examination environment, disabling by the processor of the handheld graphing calculator, the computer algebra system.

8. The method of claim 7, wherein displaying further comprises displaying the at least one asymptote on a graph of the generalized rational function.

9. The method of claim 7, wherein determining further comprises:
   computing, by the processor, a slope of a graph of the generalized rational function as values of an input of the generalized rational function approach the ∞ or −∞;
   computing, by the processor, a y-intercept of a line with the slope;

determining, by the processor, that there is a horizontal asymptote at the y-intercept when the slope is zero; and determining, by the processor, that there is an oblique asymptote when the slope is not zero.

10. A digital device comprising:

a non-transitory computer-readable medium storing software instructions for evaluating a generalized rational function, wherein the software instructions comprise software instructions to:
- in response to a graphing request and an examination environment setting received by the digital device indicating a non-examination environment:
  - compute, by a computer algebra system, all discontinuities of the generalized rational function using a discontinuity determination process to determine the discontinuities, the discontinuity determination process comprising software instructions to:
    - determine that there is no discontinuity in an input to the process when the input is a constant or a variable;
    - determine a top level operator of the input when the input is not a constant or a variable;
    - when the top level operator is negation, recursively apply the discontinuity determination process to an operand of the negation;
    - when the top level operator is addition, multiplication, or subtraction, recursively apply the discontinuity determination process to a left operand of the top level operator, and recursively apply the discontinuity determination process to a right operand of the top level operator; and
    - when the top level operator is division, recursively apply the discontinuity determination process to a numerator of the top level operator, and determine zeroes of a denominator of the top level operator;
    - wherein the generalized rational function is an initial input to the discontinuity determination process;
  - determine, for each discontinuity determined by the discontinuity determination process, whether or not the discontinuity is a removable discontinuity and
  - display each removable discontinuity on a display screen; and
- in response to the graphing request and the examination environment setting indicating an examination environment, disabling the computer algebra system; and at least one processor coupled to the non-transitory computer-readable medium to execute the software instructions.

11. The digital device of claim 10, wherein the software instructions to display further comprise software instructions to display coordinates of each removable discontinuity.

12. The digital device of claim 10, wherein the software instructions to display further comprise software instructions to display each removable discontinuity on a graph of the generalized rational function.

13. The digital device of claim 10, wherein the digital device is a handheld graphing calculator.

14. The digital device of claim 10, wherein the software instructions of the discontinuity determination process further comprise software instructions to:
- when the top level operator is exponentiation and an exponent is a positive integer, recursively apply the discontinuity determination process to a base of the exponentiation; and
- when the top level operator is exponentiation, the exponent is a negative integer, and the base is a polynomial, determine zeroes of the base.

15. The digital device of claim 10, wherein the software instructions for evaluating a generalized rational function further comprise software instructions to:
- determine that a discontinuity computed by the discontinuity determination process is a vertical asymptote; and
- display the vertical asymptote on the display screen.

\* \* \* \* \*